(12) United States Patent
Wang et al.

(10) Patent No.: US 12,007,585 B2
(45) Date of Patent: Jun. 11, 2024

(54) TERMINAL DEVICE WITH CAMERA MODULE HAVING OPTICAL LENS AND METHOD FOR ASSEMBLING SAME

(71) Applicant: NINGBO SUNNY OPOTECH CO., LTD., Zhejiang (CN)

(72) Inventors: Mingzhu Wang, Yuyao (CN); Lifeng Yao, Yuyao (CN); Zhenyu Chen, Yuyao (CN)

(73) Assignee: NINGBO SUNNY OPOTECH CO., LTD., Yuyao (CN)

( * ) Notice: Subject to any disclaimer, the term of this patent is extended or adjusted under 35 U.S.C. 154(b) by 621 days.

(21) Appl. No.: 17/285,052

(22) PCT Filed: Sep. 12, 2019

(86) PCT No.: PCT/CN2019/105630
§ 371 (c)(1),
(2) Date: Apr. 13, 2021

(87) PCT Pub. No.: WO2020/082928
PCT Pub. Date: Apr. 30, 2020

(65) Prior Publication Data
US 2022/0003900 A1 Jan. 6, 2022

(30) Foreign Application Priority Data
Oct. 24, 2018 (CN) .......................... 201811242257.2

(51) Int. Cl.
*G02B 3/04* (2006.01)
*G02B 5/20* (2006.01)
(Continued)

(52) U.S. Cl.
CPC .............. *G02B 3/04* (2013.01); *G02B 5/20* (2013.01); *G02B 7/021* (2013.01); *G02B 7/025* (2013.01);
(Continued)

(58) Field of Classification Search
CPC . G02B 3/04; G02B 5/20; G02B 7/021; G02B 7/025; G02B 3/00; G02B 3/02;
(Continued)

(56) References Cited

U.S. PATENT DOCUMENTS

2004/0240078 A1  12/2004  Sekiyama
2012/0081676 A1  4/2012  Hirata et al.
(Continued)

FOREIGN PATENT DOCUMENTS

CN    102959447 A    3/2013
CN    104395804 A    3/2015
(Continued)

OTHER PUBLICATIONS

Extended European Search Report dated Oct. 1, 2021 for Application No. 19876362.5.
(Continued)

*Primary Examiner* — Arnel C Lavarias
(74) *Attorney, Agent, or Firm* — Birch, Stewart, Kolasch & Birch, LLP

(57) ABSTRACT

A terminal device having a camera module having an optical camera lens is provided. The optical camera lens includes: a lens barrel having an axis and a lens barrel side face surrounding the axis, wherein the lens barrel side face includes a first side and a second side opposite to the first side and a lens sheet set mounted in the lens barrel and including a plurality of lenses, wherein the plurality of lenses include at least one free-form lens, and the at least one free-form lens is adapted to deflect incident light toward the second side, so that an imaging plane of an optical system composed of the plurality of lens sheets is deflected toward the second side.

19 Claims, 4 Drawing Sheets

(51) Int. Cl.
*G02B 7/02* (2021.01)
*G03B 30/00* (2021.01)
*H04M 1/02* (2006.01)
*H04N 23/55* (2023.01)
*H04N 23/57* (2023.01)

(52) U.S. Cl.
CPC .......... *G03B 30/00* (2021.01); *H04M 1/0264* (2013.01); *H04N 23/55* (2023.01); *H04N 23/57* (2023.01)

(58) Field of Classification Search
CPC ........ G02B 7/02; G02B 13/001; G02B 13/00; G02B 13/0015; G02B 13/002; G02B 13/0055; G02B 13/0085; H04N 23/57; H04N 23/55; G03B 30/00; H04M 1/0264
USPC ....... 359/433, 362, 363, 708, 720, 811, 819, 359/821; 396/268, 275, 529
See application file for complete search history.

(56) References Cited

U.S. PATENT DOCUMENTS

| | | | |
|---|---|---|---|
| 2015/0089789 A1* | 4/2015 | Nagayama | G01M 11/0221 |
| | | | 29/525.01 |
| 2017/0212334 A1 | 7/2017 | Imaoka | |

FOREIGN PATENT DOCUMENTS

| | | | | |
|---|---|---|---|---|
| CN | 106291939 A | 1/2017 | | |
| CN | 102445823 B | 4/2017 | | |
| CN | 207336902 U | 5/2018 | | |
| JP | 2010-191345 A | 9/2010 | | |
| WO | WO 2010/101008 A1 | 9/2010 | | |
| WO | WO 2017/149092 A2 | 9/2017 | | |
| WO | WO-2019143002 A1 * | 7/2019 | ............ G02B 7/021 |

OTHER PUBLICATIONS

International Search Report for PCT/CN2019/105630 (PCT/ISA/210) dated Dec. 12, 2019.

* cited by examiner

TERMINAL DEVICE WITH CAMERA MODULE HAVING OPTICAL LENS AND METHOD FOR ASSEMBLING SAME

CROSS-REFERENCE TO RELATED APPLICATIONS

The present application claims the priority of Chinese invention patent application No. 201811242257.2, entitled "OPTICAL LENS, CAMERA MODULE, METHOD FOR ASSEMBLING SAME, AND CORRESPONDING TERMINAL DEVICE", filed with the China National Intellectual Property Administration (CNIPA) on Oct. 24, 2018, which is incorporated herein by reference in its entirety.

TECHNICAL FIELD

The present application relates to the technical field of optical imaging. Specifically, the present application relates to an optical camera lens, a camera module, a method for assembling same, and a corresponding terminal device.

BACKGROUND

With the development of mobile phones, computers and other terminals, users have improved a lot for various needs. Especially with the development of mobile phones, the users' pursuit of photographing quality has led manufacturers to develop personalized and customized camera modules such as those with a large aperture and a large wide angle, and camera lenses with a large number of lens sheets that solve aberrations. On the one hand, this makes the optical design more and more complicated. On the other hand, the complex optical system is very sensitive, which poses no small challenge to the manufacturing yield and product quality. For example, the compact development of mobile phones and the increase in screen-to-body ratio of mobile phones have made the space available for front camera modules in the mobile phones smaller and smaller, and the market has put forward higher and higher demands for the imaging quality of camera modules.

Specifically, from the perspective of visual effect, although the display screen of the current smart phone can achieve larger screen display, due to the limitations of mobile phone manufacturing technology, the border region around the mobile phone screen is impossible or difficult to achieve full-screen together with the mobile phone screen, leading to the difficulty of achieving the best visual effect and appearance effect. In the current market, the vast majority of mobile phones use high-definition cameras as one of the main selling points, and the users' requirements for cameras are also getting higher and higher. Using mobile phones to take selfies has become a common habit of many mobile phone users, and the front camera has been widely used in selfie scenes. It can be said that the front camera has become an indispensable configuration in the mobile phones. The camera (i.e. camera module) must have one light passing path, and thus the traditional camera cannot be designed to overlap with the display screen, because the screen will reduce the light entering the camera module, or even completely block the light from entering the camera module. The camera module itself has a certain volume. When the camera module and the display screen are arranged staggered, the camera module will occupy a certain space, so that the region where the camera module is located cannot provide display. Therefore, the conventional mobile phone on the current market has a larger black border on the top side (i.e. a side where the front camera module is configured). A solution that can reduce the above black border is eagerly desired on the market.

SUMMARY

The present application is intended to provide a solution that can overcome at least one shortcoming of the prior art.

According to an aspect of the present application, there is provided an optical camera lens, comprising: a lens barrel having an axis and a lens barrel side surface surrounding the axis, the lens barrel side surface comprising a first side and a second side opposite to the first side; and a lens sheet set mounted in the lens barrel and comprising a plurality of lenses, wherein the plurality of lenses comprise at least one free-form lens, and the at least one free-form lens is adapted to deflect incident light toward the second side, so that an imaging plane of an optical system composed of the plurality of lens sheets is offset toward the second side.

In the optical camera lens, the first side is a fitting side adapted to be disposed at a border of a terminal device, and the second side is an opposite side located at a position opposite to the fitting side; and the at least one free-form lens is located at a rear end of the other lenses of the lens sheet set.

In the optical camera lens, the lens barrel comprises a first lens barrel and a second lens barrel, the at least one free-form lens is mounted in the second lens barrel, the other lenses of the lens sheet set are mounted in the first lens barrel, and the first lens barrel and the second lens barrel are bonded by a first glue material to constitute the lens barrel.

In the optical camera lens, the first glue material is adapted to support and fix the first lens barrel and the second lens barrel after curing, so that a relative position of a first lens sheet group and a second lens sheet group is maintained at a relative position determined by active alignment, wherein the first lens sheet group is a lens sheet group composed of all lenses mounted in the first lens barrel, and the second lens sheet group is a lens sheet group composed of all lenses mounted in the second lens barrel.

In the optical camera lens, the optical camera lens has a mark for characterizing an offset direction of the imaging plane.

In the optical camera lens, the free-form lens is axisymmetric, and a direction of a symmetry axis (the course of the symmetry axis) of the free-form lens is consistent with an offset direction of the imaging plane.

In the optical camera lens, an optical zone of the free-form lens comprises a first region close to the first side and a second region close to the second side, and the maximum thickness of the first region is less than the maximum thickness of the second region.

In the optical camera lens, an optical zone of the free-form lens comprises a first region close to the first side and a second region close to the second side, and an average curvature of the first region is less than an average curvature of the second region.

In the optical camera lens, the free-form lens comprises an object side surface and an image side surface; and light incident on the free-form lens is not deflected on the object-side surface but is deflected only on the image side surface, or the light incident on the free-form lens is deflected on both the object side surface and the image side surface.

In the optical camera lens, the at least one free-form lens tilts an optical axis of the optical camera lens toward a direction of the deflection.

According to another aspect of the present application, there is further provided a camera module comprising: any one optical camera lens described above; and a photosensitive assembly, wherein the optical camera lens is mounted on the photosensitive assembly.

In the camera module, the photosensitive assembly comprises a photosensitive chip, and a center of a photosensitive region of the photosensitive chip coincides with a center of the imaging plane offset toward the second side.

In the camera module, the photosensitive assembly comprises a photosensitive chip, and a central axis of a photosensitive region of the photosensitive chip is closer to the second side than a central axis of the lens barrel.

In the camera module, an outer side surface of the photosensitive assembly has a fitting side adapted to be disposed at a border of a terminal device, the fitting side of the outer side surface has a retracted surface retracted from outside to inside, and one end of the retracted surface is located on a bottom surface of the photosensitive assembly.

In the camera module, the photosensitive assembly comprises: a circuit board; a photosensitive chip mounted on the circuit board; a lens holder mounted on a surface of the circuit board and surrounding the photosensitive chip; and a color filter mounted on the lens holder; wherein a top surface of the lens holder and the optical camera lens are bonded by a second glue material.

In the camera module, the optical camera lens and the photosensitive assembly are bonded by a second glue material, and the fitting side of the photosensitive assembly and the first side of the optical camera lens are arranged on the same side; and the second glue material is adapted to support and fix the optical camera lens and the photosensitive assembly after curing, so that a relative position of the optical camera lens and the photosensitive assembly is maintained at a relative position determined by active alignment.

In the camera module, the lens barrel comprises a first lens barrel and a second lens barrel, the at least one free-form lens is mounted in the second lens barrel, the other lenses of the lens sheet set are mounted in the first lens barrel, wherein a top surface of the second lens barrel or a top surface of the second lens sheet group has a mark for characterizing an offset direction of the imaging plane.

According to another aspect of the present application, there is further provided a terminal device, comprising: a housing with a border; and any one camera module described above, wherein a fitting side of the optical camera lens and a fitting side of the photosensitive assembly are both disposed at adapting positions of the border, an inner side surface of the border has a recessed portion recessed toward an outer side surface of the border, and the recessed portion accommodates the fitting side of the optical camera lens.

In the terminal device, the border is a top border of the terminal device.

In the terminal device, the terminal device is a smart phone, the border is a top border of the smart phone, the camera module is a front camera module of the smart phone, and an outer side surface of the border is arc-shaped.

According to another aspect of the present application, there is further provided an assembling method for optical camera lens, comprising: preparing a first lens component and a second lens component, wherein the first lens component comprises a first lens sheet group, the second lens component comprises a second lens sheet group, the second lens sheet group comprises at least one free-form lens, and the second lens component has a first side and a second side opposite to the first side; pre-positioning the first lens component and the second lens component so that the first lens sheet group and the second lens sheet group constitute an imageable optical system, wherein the at least one free-form lens is adapted to deflect incident light toward the second side so that an imaging plane of the optical system is offset toward the second side; performing active alignment on the first lens component and the second lens component, wherein the active alignment is to adjust a relative position of the first lens component and the second lens component based on an actual imaging result of the optical system; and bonding the first lens component and the second lens component, so that the relative position of the two is maintained at a relative position determined by active alignment. In the assembling method for optical camera lens, the first side may be a fitting side adapted to be disposed at a border of a terminal device, and the second side may be an opposite side located at a position opposite to the fitting side.

According to another aspect of the present application, there is further provided an assembling method for camera module, comprising: preparing a first lens component, a second lens component and a photosensitive assembly, wherein the first lens component comprises a first lens sheet group, the second lens component comprises a second lens sheet group, the second lens sheet group comprises at least one free-form lens, the second lens component has a first side and a second side opposite to the first side, and the photosensitive assembly comprises a photosensitive chip; pre-positioning the first lens component, the second lens component and the photosensitive assembly, so that the first lens sheet group and the second lens sheet group constitute an imageable optical system, and the photosensitive chip can receive an image formed by the optical system, wherein the at least one free-form lens is adapted to deflect incident light toward the second side, so that an imaging plane of the optical system is offset toward the second side; performing active alignment on the first lens component, the second lens component and the photosensitive assembly, wherein the active alignment is to adjust a relative position of the first lens component and the second lens component, and a relative position of the second lens component and the photosensitive assembly based on an actual imaging result of the optical system; and bonding the first lens component and the second lens component, and bonding the second lens component and the photosensitive assembly, so that the relative positions of the first lens component, the second lens component, and the photosensitive assembly are all maintained at relative positions determined by active alignment. In the assembling method for camera module, the first side may be a fitting side adapted to be disposed at a border of a terminal device, and the second side may be an opposite side located at a position opposite to the fitting side.

Compared with the prior art, the present application has at least one of the following technical effects:

1. In the present application, the effective light passing path of the camera lens can be deflected so as to keep away from the housing, other parts or any other structure, thereby making the structure of the device equipped with the optical camera lens or camera module more compact.

2. The subject matter of the present application allows to reduce the aberration of the optical system with the free-form lens, thereby improving the imaging quality.

3. The subject matter of the present application allows to reduce the volume on one side of the photosensitive assembly (e.g. a side of the lens holder and/or the circuit board close to the border of the device) to make the device more compact.

4. The subject matter of the present application allows to increase the screen-to-body ratio of terminal devices (e.g. smart phones).

5. The subject matter of the present application is particularly suitable for increasing the screen-to-body ratio of smart phones with arc-shaped borders.

BRIEF DESCRIPTION OF THE DRAWINGS

The exemplary embodiments are shown in the reference drawings. The embodiments and drawings disclosed herein are to be considered illustrative and not restrictive.

DETAILED DESCRIPTION

Figure 1:
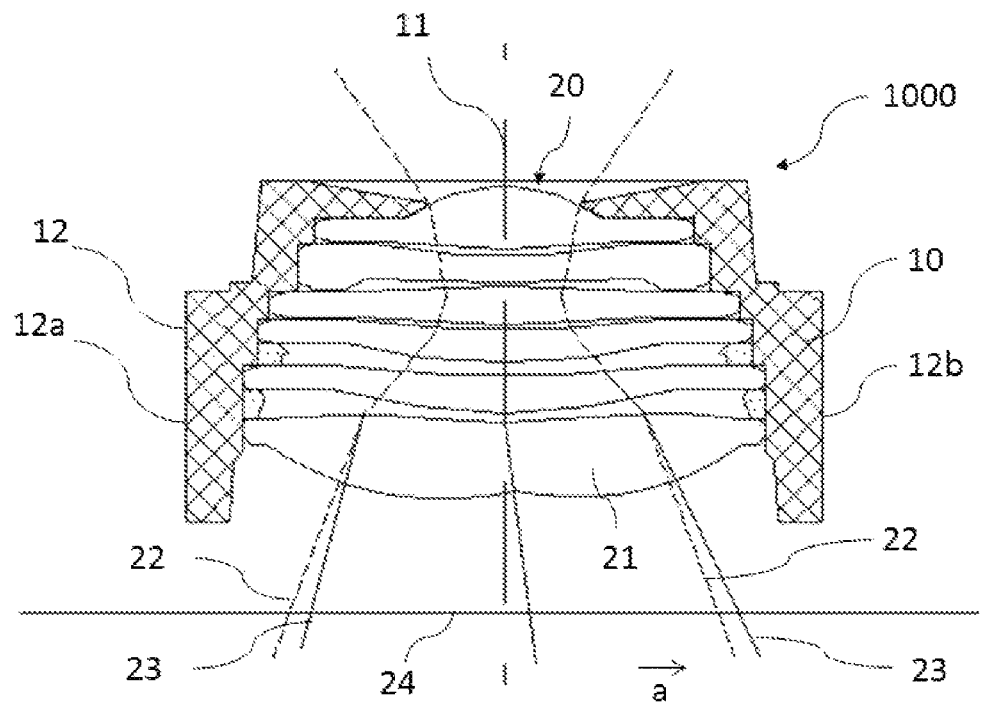
FIG. 1 shows a schematic cross-sectional view of an optical camera lens with a free-form lens and its light passing path according to an embodiment of the present application.

In order to better understand the present application, various aspects of the present application will be described in more detail with reference to the drawings. It should be understood that the detailed depiction is merely description of exemplary embodiments of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", etc. are only used to distinguish one feature from another feature, and do not indicate any limitation on the feature. Therefore, without departing from the teachings of the present application, a first main body discussed below may also be referred to as a second main body.

In the drawings, for convenience of explanation, the thickness, size, and shape of the object have been slightly exaggerated. The drawings are only examples and are not drawn strictly to scale.

It should also be understood that the terms "comprising", "comprise", "having", "including" and/or "include" when used in the present description, indicate the existence of stated features, integers, steps, operations, elements and/or components, but does not exclude the presence or addition of one or more other features, integers, steps, operations, elements, components and/or combinations thereof. Furthermore, when an expression such as "at least one of" appears after the list of listed features, it modifies the entire list of listed features, rather than the individual elements in the list.

In addition, when describing the implementations of the present application, the use of "may" means "one or more implementations of the present application", and, the term "exemplary" refers to an example or illustration.

As used herein, the terms "substantially", "approximately" and similar terms are used as a term expressing an approximation and not as a term expressing an extent, and are intended to indicate an inherent deviation in a measurement value or calculated value, which will be recognized by those of ordinary skill in the art.

Unless otherwise defined, all terms (including technical and scientific terms) used herein have the same meanings as commonly understood by those of ordinary skill in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It needs to be explained that, in the case of no conflict, the embodiments in the present application and the features in the embodiments can be combined with each other. The present application will be described in detail below in conjunction with embodiments with reference to the drawings.

FIG. 1 shows a schematic cross-sectional view of an optical camera lens with a free-form lens and its light passing path according to an embodiment of the present application. Referring to FIG. 1, in this embodiment, the optical camera lens 1000 includes: a lens barrel 10 and a lens sheet set 20. The lens barrel 10 has an axis 11 and a lens barrel side surface 12 surrounding the axis 11. The lens barrel side surface 12 includes a fitting side 12a adapted to be disposed at a border of a terminal device and an opposite side 12b located at a position opposite to the fitting side. The lens sheet set 20 is mounted in the lens barrel 10. The lens sheet set 20 includes a plurality of lenses, and the plurality of lenses includes one free-form lens 21 (it needs to be noted that in other embodiments, the plurality of lenses may include two or more free-form lenses). The free-form lens 21 is adapted to deflect incident light toward the opposite side 12b, so that an imaging plane 24 of an optical system composed of the plurality of lens sheets is offset toward an opposite side 12b. An arrow a in FIG. 1 shows an offset direction. Here, the offset of the imaging plane 24 refers to the overall offset of the range covered by the effective light passing path of the optical system. As shown in FIG. 1, a dashed line 22 shows an original effective light passing path under the assumption that there is no free-form lens, and a solid line 23 shows an effective light passing path that is deflected after passing through the free-form lens 21. In the existing conventional camera lens, lens sheets are all composed of rotationally symmetric lenses, and thus the effective light passing path of the camera lens is also rotationally symmetrical. However, after the free-form lens is provided in the optical camera lens, the free-form lens can be used to control the characteristics of the exit angle and direction of each ray of light, so that the effective light passing path is deflected toward one direction, and corresponds to the imaging plane, and the imaging plane is also offset accordingly (in other words, the optical axis is deflected, the original optical axis is perpendicular to a photosensitive surface, after the free-form lens is provided, the optical axis of the lens set consisting of ordinary lenses is still perpendicular to the photosensitive surface, and the optical axis is tilted with respect to the photosensitive surface after being refracted by the lens set consisting of the free-form lens). When the optical camera lens shown in FIG. 1 is used to make a camera module, non-optical components such as a corresponding support and a circuit board also need to be changed in structure to prevent the deflected light path from being blocked.

Further, still referring to FIG. 1, in an embodiment, the free-form lens is located at a rear end of other lenses of the lens sheet set. Herein, the rear end refers to an end close to an image side.

Figure 2:
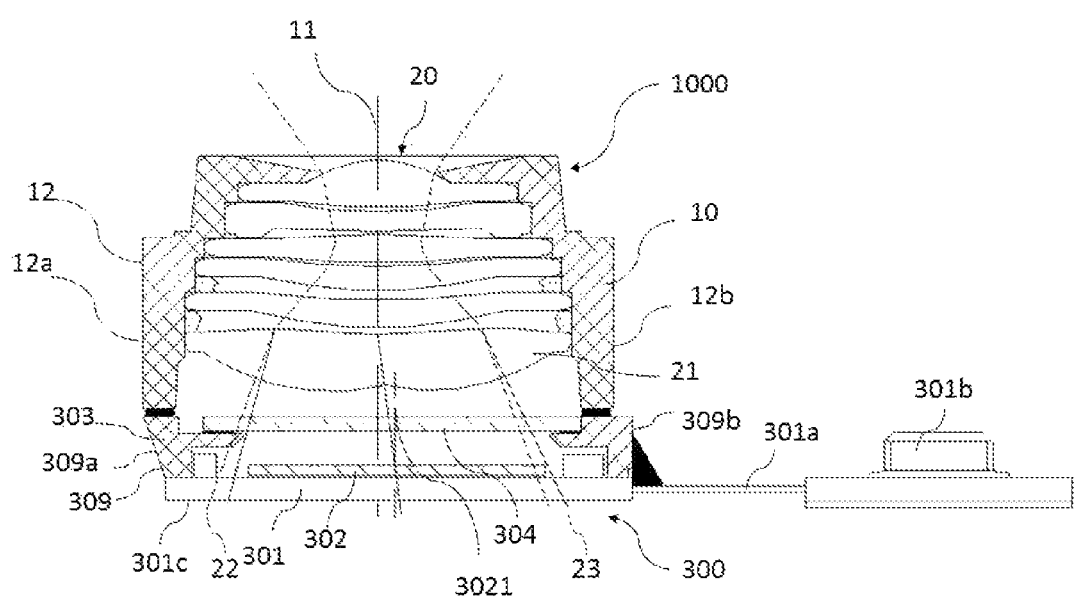
FIG. 2 shows a schematic cross-sectional view of a camera module with a free-form lens and its light passing path according to an embodiment of the present application.

FIG. 2 shows a schematic cross-sectional view of a camera module with a free-form lens sheet and its light passing path according to an embodiment of the present application. Referring to FIG. 2, in this embodiment, the camera module includes an optical camera lens 1000 and a photosensitive assembly 300. The optical camera lens may be the optical camera lens of the embodiment shown in FIG. 1, that is, the optical camera lens has a free-form lens 21. The free-form lens 21 is adapted to deflect incident light toward the opposite side 12b, so that the imaging plane 24 of the optical system composed of the plurality of lens sheets is offset toward the opposite side 12b. The optical camera lens is mounted on the photosensitive assembly 300.

Still referring to FIG. 2, in an embodiment, the photosensitive assembly 300 includes a photosensitive chip 302, and a center of a photosensitive region of the photosensitive chip 302 coincides with a center of the imaging plane offset toward the opposite side 12b. A central axis 3021 of the photosensitive region of the photosensitive chip 302 is closer to the opposite side 12b than a central axis 11 of the lens barrel. Specifically, the photosensitive assembly 300 may include a circuit board 301, a photosensitive chip 302, a lens holder 303, and a color filter 304. The photosensitive chip 302 is mounted on the circuit board 301 (for example, attached to a surface of the circuit board 301). The lens holder 303 is mounted on a surface of the circuit board 301 and surrounds the photosensitive chip 302. The color filter 304 is mounted on the lens holder 303. The photosensitive assembly 300 may have a fitting side 309a adapted to be disposed at a border of a terminal device and an opposite side 309b located on a side opposite to the fitting side 309a. The fitting side 309a of the photosensitive assembly 300 and a fitting side 12a of the optical camera lens 1000 may be arranged on the same side. On the opposite side 309b, the circuit board 301 can be connected to a connector 301b through a flexible connection strap 301a, and the connector 301b can be used to electrically connect a main board of a terminal device (such as a smart phone). In this embodiment, since the free-form lens deflects the originally rotationally symmetric light, the screen printing setting on the corresponding color filter 304 may be uneven. The free-form lens may have a symmetry axis that is overlapped with a symmetry axis of the photosensitive assembly.

In an embodiment of the present application, the photosensitive assembly 300 and the optical camera lens 1000 may be assembled based on active alignment to obtain a camera module. The top surface of the lens holder 303 can be bonded to the optical camera lens 1000 through a second glue material. The second glue material is adapted to support and fix the optical camera lens and the photosensitive assembly after curing, so that a relative position of the optical camera lens and the photosensitive assembly is maintained at a relative position determined by active alignment. In this embodiment, the active alignment is to adjust the relative position of the optical camera lens 1000 and the photosensitive assembly 300 based on an actual imaging result of the optical system.

Further, still referring to FIG. 2, in an embodiment of the present application, an outer side surface of the photosensitive assembly 300 has a fitting side 309a adapted to be disposed at a border of a terminal device, the fitting side of the outer side surface has a retracted surface 309 retracted from the outside to the inside (referring to a direction from the fitting side 12a to the central axis 3021 of the photosensitive assembly), and one end of the retracted surface 309 is located at a bottom surface 301c of the photosensitive assembly 300. As shown in FIG. 2, an inclined surface can be formed on the fitting side 309a of the lens holder 303, and an outer side surface of the circuit board is also correspondingly retracted from the outside to the inside, thereby obtaining the retracted surface 309. The contour line of the retracted surface can be a straight line, an arc line, a fold line or any other shape, as long as the outer side surface of the photosensitive assembly 300 can be retracted from the outside to the inside, and one end of the retracted surface 309 is located at the bottom surface 301c of the photosensitive assembly 300. The retracted surface 309 can be directly formed into a required shape during injection molding, or can be made into a conventional right-angle shape, and then part of the material is removed by cutting or grinding to form the required shape of the retracted surface.

Figure 3:
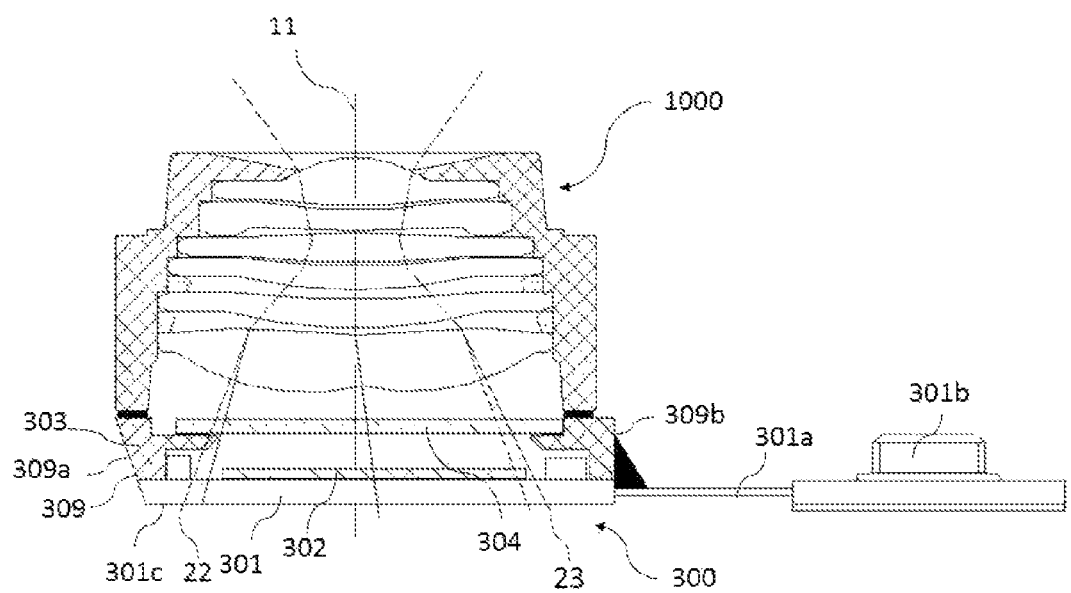
FIG. 3 shows a schematic cross-sectional view of a camera module with a free-form lens and its light passing path according to another embodiment of the present application.

FIG. 3 shows a schematic cross-sectional view of a camera module with a free-form lens and its light passing path according to another embodiment of the present application. The difference between this embodiment and the embodiment shown in FIG. 2 is that the outer side surface of the circuit board 301 (referring to the outer side surface located on the fitting side 309a) in this embodiment is made into an inclined surface, while the outer side surface of the circuit board 301 (referring to the outer side surface located on the fitting side 309a) in the embodiment shown in FIG. 2 is a vertical surface (that is, the outer side surface of the circuit board 301 is perpendicular to the bottom surface 301c).

Figure 4:
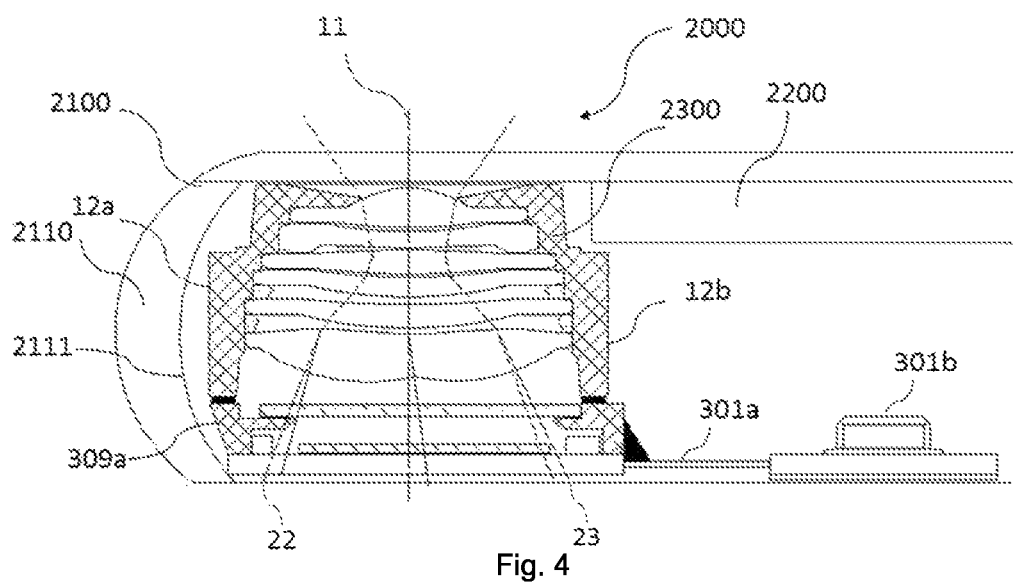
FIG. 4 shows a schematic partial cross-sectional view of a smart phone according to another embodiment of the present application.

FIG. 4 shows a schematic partial cross-sectional view of a smart phone according to another embodiment of the present application. The smart phone 2000 includes a housing 2100, a display screen 2200, and a front camera module 2300. It needs to be noted that the smart phone further includes many other elements, but the three elements, namely the housing, the display screen and the front camera module, are mainly involved in the present application, and the other elements will not be described in detail. The housing 2100 has an arc-shaped top border 2110. The camera module 2300 adopts a camera module shown in FIG. 2 or 3. The fitting side 12a of the optical camera lens and the fitting side 309a of the photosensitive assembly are both disposed at adapting positions of the arc-shaped top border 2110. In this embodiment, an inner side surface 2111 of the arc-shaped border 2110 is arc-shaped. It needs to be noted that in other embodiments of the present application, the top border 2110 may also be replaced by other borders (such as a bottom border, a left border, or a right border) of the mobile phone housing. In addition to the smart phone, it may also relate to other types of terminal devices.

In the embodiment shown in FIG. 4, the border (i.e. the top border) where the camera module is located is recessed so as to have a space for accommodating part of the camera module, and the inner side surface of the arc-shaped border may be arc-shaped, or may be triangular, rectangular or trapezoidal. In principle, it may be of any shape, as long as the inner side surface of the border has a recessed portion that is recessed toward the outer side surface of the border, and the recessed portion can accommodate the fitting side of the optical camera lens. The outer side surface of the border may be arc-shaped. Thus, the camera module can be engaged in the border, and the position of the module in the mobile phone is closer to the top of the mobile phone, so that the light passing hole of the camera module can be moved toward the top of the mobile phone, leaving more space for the display screen and reducing the width of the black border of the mobile phone. On the other hand, in the embodiment shown in FIG. 4, the free-form lens in the optical camera lens is used to control the exit angle and direction of each ray of light, and the effective light passing path of the camera lens is deflected toward the opposite side 12b (that is actually a side opposite to a side close to the border), so that the imaging plane of the camera lens is offset toward the opposite side 12b. Therefore, the position of the photosensitive chip can be offset toward the opposite side 12b accordingly, so that the camera module can be closer to the fitting side 12a (that is actually the side close to the border). Finally, the free-form lens further has an aberration correction function, which can better improve the imaging quality of the camera lens.

Further, in an embodiment of the present application, in the optical camera lens, the free-form lens is disposed at the rearmost end of the camera lens. If there is only one free-form lens in the optical camera lens, then it is disposed at the rearmost sheet. If there are multiple sheets, then the last few sheets are all free-form lenses. The "rear" here refers to a rear end of the optical camera lens, namely, an end close to an image side.

Further, in an embodiment of the present application, in the optical camera lens, an optical zone of the disposed free-form lens or free-form lens set may be axisymmetric (axisymmetric under a top view angle, wherein the top view angle is an angle of view from the front of the photosensitive chip), and the direction of the symmetry axis of the free-form lens is consistent with the offset direction of the imaging plane.

Further, in an embodiment of the present application, an identification mark is provided in the optical camera lens, and the mark can be implemented by a difference in shape or color. For example, a small protrusion is disposed on the lens barrel. The mark may have a preset angle to the offset direction of the imaging plane. Preferably, the mark is located in the offset direction of the imaging plane, that is, the preset angle is 0 degrees. In brief, it is sufficient that the mark can be used to characterize the offset direction of the imaging plane. In an embodiment, when the lens barrel is configured as a single-piece lens barrel as shown in FIG. 1, the mark may be disposed on a top surface of the lens barrel or a top surface of the lens sheet group. When the optical camera lens of this embodiment and photosensitive assembly are assembled into a camera module, a machine needs to recognize the set mark in advance, determine the direction of the optical camera lens, and then perform active alignment (in the industry, usually called AA process, i.e. Active Alignment) to assemble the camera module (this is different from the assembly process of the conventional camera module). The movement of the camera lens relative to the photosensitive assembly in at least one direction is adjusted through the imaging effect of the module, so that the center of the offset imaging plane is aligned with the center axis of the photosensitive region of the photosensitive chip. In another embodiment, the lens barrel includes a first lens barrel and a second lens barrel, the at least one free-form lens is mounted in the second lens barrel, the other lenses of the lens sheet set are mounted in the first lens barrel, and the first lens barrel and the second lens barrel are bonded by a first glue material to constitute the lens barrel. In this embodiment, the optical camera lens with the offset imaging plane is assembled based on active alignment, and then the optical camera lens and the photosensitive assembly are assembled into a camera module. At this time, a mark for characterizing the offset direction of the imaging plane may be disposed on the top surface of the first lens barrel (or the top surface of the first lens sheet group) and the top surface of the second lens barrel (or the top surface of the second lens sheet group). In this way, in the process of assembling the optical camera lens, the pre-positioning stage may be to perform machine recognition on the mark on the top surface of the second lens component (which includes the second lens barrel and the second lens sheet group) to determine the direction (referring to the deflection direction) of the optical camera lens; and when assembling the camera module, machine recognition can be performed on the mark on the top surface of the first lens component (which includes the first lens barrel and the first lens sheet group) to determine the direction (referring to the deflection direction) of the optical camera lens. In another embodiment, the mark for characterizing the offset direction of the imaging plane may also be disposed only on the top surface of the second lens barrel (or the top surface of the second lens sheet group). When assembling the camera module, the three elements, namely the first lens component (which includes the first lens barrel and the first lens sheet group), the second lens component (which includes the second lens barrel and the second lens sheet group), and the photosensitive assembly, are pre-positioned and actively aligned (AA process) at the same time, and then bonded together to obtain the camera module. During pre-positioning, machine recognition can be performed on the mark on the top surface of the second lens component to determine the direction (referring to the deflection direction) of the optical camera lens.

The optical camera lens or camera module with the free-form lens provided in the present application can be assembled by adopting a split solution based on active alignment technology.

Generally, during processing of an optical camera lens, there may be design redundancy in the dimensions of each lens sheet part in the Z direction and the X and Y directions; and during processing, these redundant items may lead to deviations from the design in the actual processing. That is, the uncertainty of the optical camera lens obtained after processing is relatively large. The manufacturing tolerances and assembly tolerances that exist in the process make the imaging quality of the optical camera lens often poor. Especially for the free-form lens, it represents the characteristic of non-rotational symmetry, which may make the optical performance of the camera lens degraded due to slight angular tolerances during the assembly process of the camera lens, and therefore processing is more difficult.

However, if the camera lens is configured in split type, then the position of the free-form lens in the entire optical system can be adjusted during the assembly process, which can reduce the assembly tolerance of the lens, make up for the manufacturing tolerance of the lens, reduce the difficulty of camera lens assembly, and improve the yield of camera lens assembly.

Figure 5:
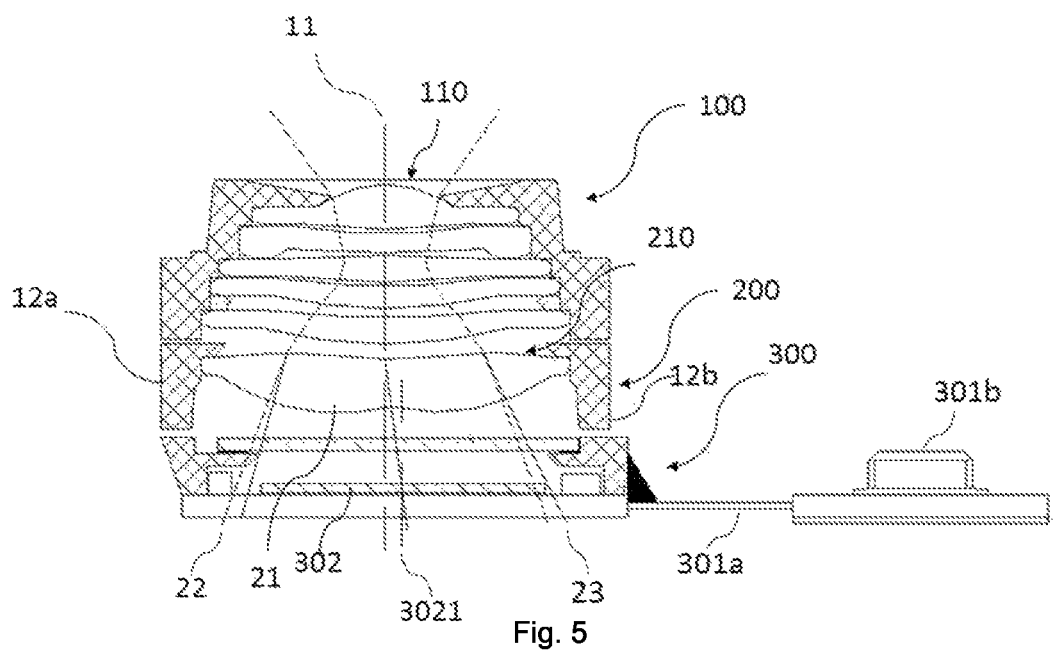
FIG. 5 shows a schematic view of assembling a camera module according to an embodiment of the present application.

FIG. 5 shows a schematic view of assembling a camera module according to an embodiment of the present application. Referring to FIG. 5, in this embodiment, a method of assembling a camera module includes steps S10 to S30.

Step S10: pre-position a first lens component 100, a second lens component 200 and a photosensitive assembly 300, so that a first lens sheet group 110 and a second lens sheet group 210 constitute an imageable optical system, and a photosensitive chip 302 can receive an image formed by the optical system, wherein the first lens component 100 includes a first lens sheet group 110, the second lens component 200 includes a second lens sheet group 210, the second lens sheet group 210 includes at least one free-form lens (which may be one free-form lens, or may be multiple free-form lenses), the second lens component 200 has a fitting side 12a adapted to be disposed at a border of a terminal device and an opposite side 12b located at a position opposite to the fitting side 12a, and the photosensitive assembly 300 includes the photosensitive chip 302; and wherein the at least one free-form lens 21 is adapted to deflect incident light toward the opposite side 12b, so that the imaging plane of the optical system is offset toward the opposite side 12b. In this embodiment, the first lens component 100 may further include a first lens barrel 120, and the first lens sheet group 110 is mounted in the first lens barrel 120. The second lens component 200 may further include a second lens barrel 220, and the second lens sheet group 210 is mounted in the second lens barrel 220. In FIG. 5, a dashed line is used to show an original effective light path under the assumption that there is no free-form lens sheet, and a solid line is used to show an effective light path that is deflected after passing through the free-form lens sheet 21. In this embodiment, an optical zone of the disposed free-form lens has a symmetry axis, and the lens component with the free-form lens has a symmetry axis of an optical zone. Therefore, it is optional to dispose an identification mark on the lens component with the free-form lens. The mark can be implemented by a difference in shape or color. For example, a small protrusion is disposed on the lens barrel. Machine recognition may be used to identify the mark, determine its direction, and then clamp each component through a device for pre-positioning.

Step S20: perform active alignment on the first lens component 100, the second lens component 200 and the photosensitive assembly 300, wherein the active alignment is to adjust a relative position of the first lens component 100 and the second lens component 200, and a relative position of the second lens component 200 and the photosensitive assembly 300 based on an actual imaging result of the optical system. The adjustment of the relative position of the first lens component 100 and the second lens component 200 and the adjustment of the relative position of the second lens component 200 and the photosensitive assembly 300 may be performed simultaneously. In this embodiment, an imaged picture obtained by the photosensitive assembly 300 is actively aligned (AA process) to improve the imaging quality of the camera lens and the camera module.

Step S30: bond the first lens component 100 and the second lens component 200, and bond the second lens component 200 and the photosensitive assembly 300, so that the relative positions of the first lens component 100, the second lens component 200, and the photosensitive assembly 300 are all maintained at relative positions determined by active alignment. The bonding may include two sub-steps of arranging a glue material and curing the glue material, wherein the sub-step of arranging the glue material may be performed before the active alignment step (i.e. step S20) or after the active alignment step. The sub-step of curing the glue material is performed after the active alignment step.

In an embodiment, in the assembled camera module, the first lens component includes a first lens barrel and a first lens sheet group. The second lens component includes a second lens barrel and a second lens sheet group. At least one free-form lens is mounted in the second lens barrel. The free-form lens is adapted to deflect incident light toward the opposite side 12b, so that the imaging plane 24 of the optical system composed of the plurality of lens sheets is offset toward the opposite side 12b. The first lens barrel and the second lens barrel are bonded by a first glue material. The first glue material is adapted to support and fix the first lens barrel and the second lens barrel after curing, so that a relative position of the first lens sheet group and the second lens sheet group is maintained at a relative position determined by active alignment. The second lens component and the photosensitive assembly are bonded by a second glue material, and the fitting side of the photosensitive assembly and the fitting side of the optical camera lens are arranged on the same side. The second glue material is adapted to support and fix the second lens component and the photosensitive assembly after curing, so that a relative position of the two is maintained at a relative position determined by the active alignment.

Figure 6:
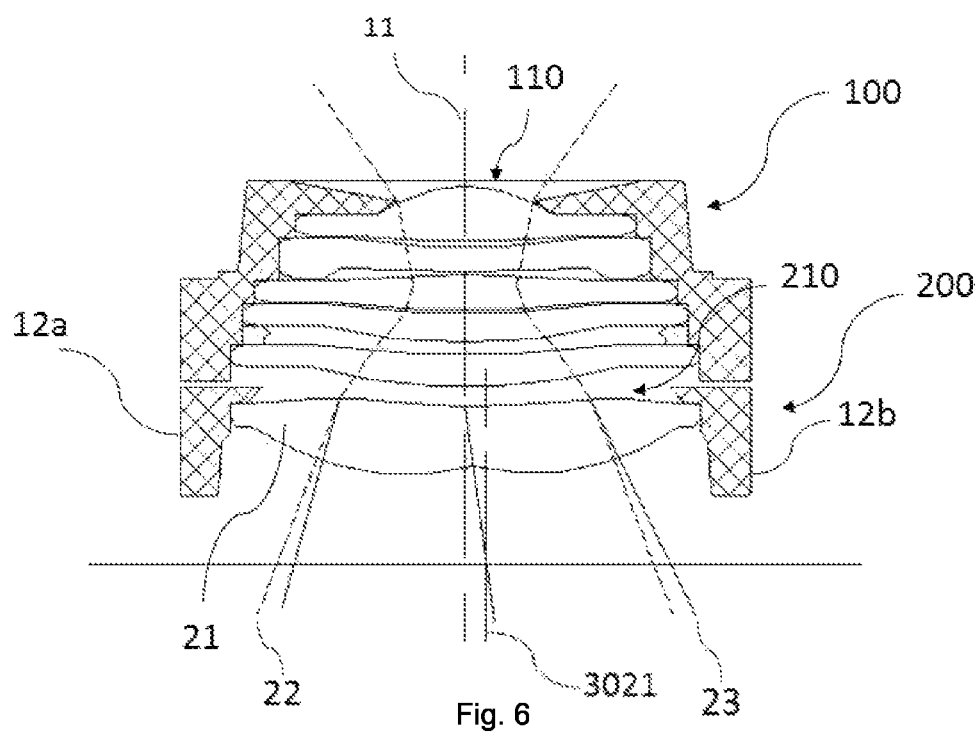
FIG. 6 shows a schematic view of assembling an optical camera lens according to an embodiment of the present application.

FIG. 6 shows a schematic view of assembling an optical camera lens according to an embodiment of the present application. Referring to FIG. 6, in this embodiment, a method of assembling an optical camera lens includes steps S100 to S300.

Step S100: pre-position a first lens component 100 and a second lens component 200, so that a first lens sheet group 110 and a second lens sheet group 210 constitute an imageable optical system, wherein the first lens component 100 includes the first lens sheet group 110, the second lens component 200 includes a second lens sheet group 210, the second lens sheet group 210 includes at least one free-form lens 21, the second lens component 200 has a fitting side 12a adapted to be disposed at a border of a terminal device and an opposite side 12b located at a position opposite to the fitting side 12a; and wherein the at least one free-form lens 21 is adapted to deflect incident light toward the opposite side 12b, so that the imaging plane of the optical system is offset toward the opposite side 12b. In this embodiment, the first lens component 100 may further include a first lens barrel 120, and the first lens sheet group 110 is mounted in the first lens barrel 120. The second lens component 200 may further include a second lens barrel 220, and the second lens sheet group 210 is mounted in the second lens barrel 220. In FIG. 6, a dashed line is used to show an original effective light path under the assumption that there is no free-form lens sheet, and a solid line is used to show an effective light path that is deflected after passing through the free-form lens sheet 21.

Step S200: perform active alignment on the first lens component 100 and the second lens component 200, wherein the active alignment is to adjust a relative position of the first lens component 100 and the second lens component 200 based on an actual imaging result of the optical system.

Step S300: bond the first lens component 100 and the second lens component 200, so that the relative position of the two is maintained at a relative position determined by active alignment. The bonding may include two sub-steps of arranging a glue material and curing the glue material, wherein the sub-step of arranging the glue material may be performed before the active alignment (i.e. step S200) or after the active alignment. The sub-step of curing the glue material is performed after the active alignment.

Figure 7:
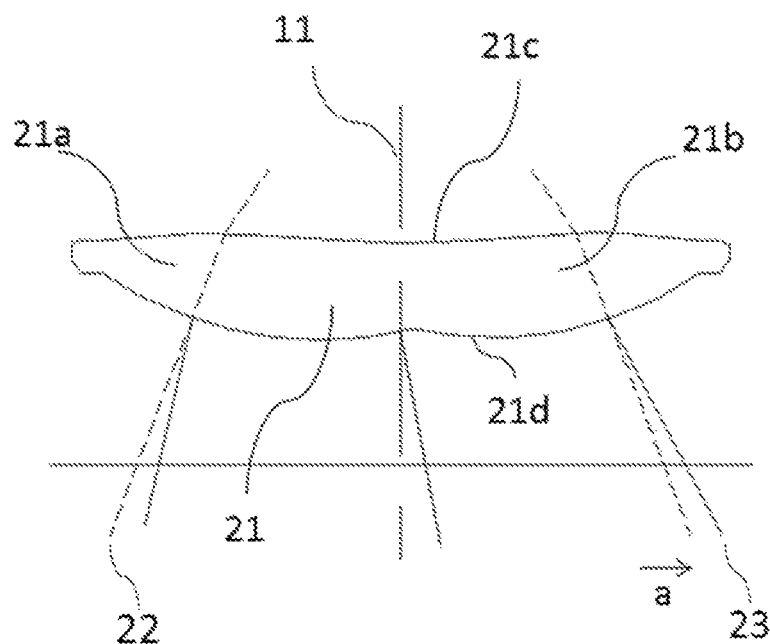
FIG. 7 shows a free-form lens according to an embodiment of the present application.

Further, FIG. 7 shows a free-form lens according to an embodiment of the present application. Referring to FIGS. 1 and 7 in combination, in order to make the free-form lens implement the deflection of incident light toward the opposite side 12b, and further an imaging plane 24 of an optical system composed of the plurality of lens sheets is offset toward the opposite side 12b, the free-form lens can be axisymmetric. The free-form lens deflects originally rotationally symmetric light toward the opposite side 12b of the optical camera lens. Therefore, the free-form lens can have a symmetry axis. When the optical camera lens is assembled in the camera module, the symmetry axis is theoretically overlapped with a symmetry axis of the camera module. In other words, referring to FIG. 7, in this embodiment, the direction of the symmetry axis of the free-form lens 21 may be consistent with an offset direction of the imaging plane. An arrow a in FIG. 7 shows the offset direction of the imaging plane. In this embodiment, the free-form lens is axisymmetric under a top view angle, wherein the top view angle is an angle of view from the front of the photosensitive chip (or the imaging plane).

Further, in another embodiment of the present application, in the optical camera lens, the free-form lens is relatively thick in a direction of light deflection, and relatively thin away from the direction of light deflection. In other words, an optical zone of the free-form lens may include a second region 21b close to the opposite side and a first region 21a close to the fitting side. The thickness of the second region 21b is greater than the thickness of the first region 21a.

Further, in another embodiment of the present application, in the optical camera lens, the average curvature of the lens on a side of the light deflection direction of the free-form lens is relatively large. In other words, the optical zone of the free-form lens may include a second region 21b close to the opposite side and a first region 21a close to the fitting side. The average curvature of the second region 21b is greater than the average curvature of the first region 21a.

Further, in another embodiment of the present application, in the optical camera lens, the free-form lens includes an object side surface 21c and an image side surface 21d. In an example, light incident on the free-form lens 21 may not be deflected on the object side surface 21c but may be deflected only on the image side surface 21d. In another example, the light incident on the free-form lens 21 may be deflected on both the object side surface 21c and the image side surface 21d.

The active alignment process used in the assembling method for optical camera lens or camera module will be further introduced below. When the number of components prepared in the preparation step is three or more, it is necessary to perform active alignment at multiple clearances between/among the multiple components, and the active alignment at the multiple clearances may be performed synchronously. For example, in an embodiment, the active alignment between the first lens component and the second lens component, and the active alignment between the second lens component and the photosensitive assembly may be performed synchronously. To make the description concise, the active alignment between the first lens component and the second lens component is described below as an example.

Figure 8A:
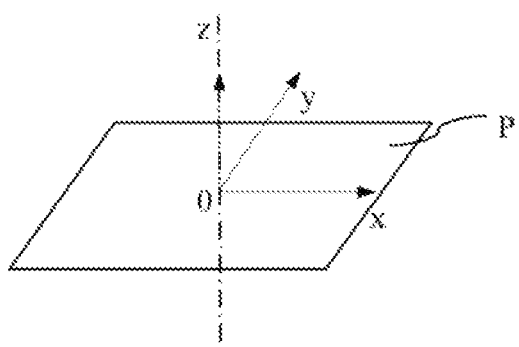
FIG. 8A shows a relative position adjustment manner in active alignment in an embodiment of the present application.

The active alignment described in the present application may be to adjust the relative position of the first lens component and the second lens component in multiple degrees of freedom. FIG. 8A shows a relative position adjustment manner in the active alignment in an embodiment of the present application. In this adjustment manner, the first lens component (or the first lens sheet) can be moved along x, y, and z directions relative to the second lens component (that is, the relative position adjustment in this embodiment has three degrees of freedom). The z direction is a direction along the optical axis, and the x and y directions are directions perpendicular to the optical axis. The x and y directions are both in an adjustment plane P, and the translation in the adjustment plane P can be decomposed into two components in the x and y directions.

Figure 8B:
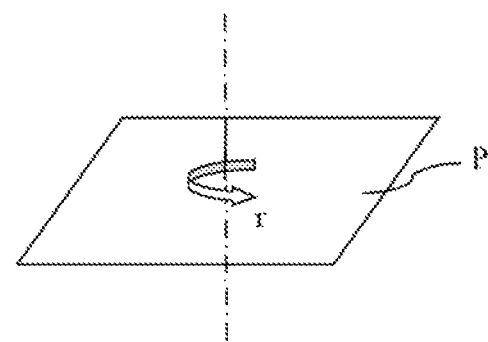
FIG. 8B shows rotation adjustment in active alignment according to another embodiment of the present application.

FIG. 8B shows rotation adjustment in the active alignment according to another embodiment of the present application. In this embodiment, in addition to the three degrees of freedom in FIG. 8A, a degree of freedom in rotation, i.e., an adjustment in an r direction, is also added to the relative position adjustment. In this embodiment, the adjustment in the r direction is rotation in the adjustment plane P, i.e. rotation around an axis perpendicular to the adjustment plane P.

Figure 8C:
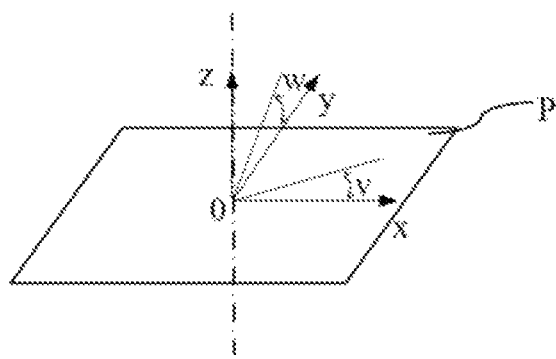
FIG. 8C shows a relative position adjustment manner in which adjustments in v and w directions are added in active alignment according to further another embodiment of the present application.

Further, FIG. 8C shows a relative position adjustment manner in which adjustments in v and w directions are added in the active alignment according to further another embodiment of the present application. The v direction represents a rotation angle of an xoz plane, and the w direction represents a rotation angle of a yoz plane. The rotation angles of the v direction and the w direction can be combined into a vector angle, which represents a total tilt state. That is to say, by adjusting in the v and w directions, the tilt attitude of the first lens component relative to the second lens component (i.e. tilt of an optical axis of the first lens component relative to an optical axis of the second lens component) can be adjusted.

The adjustments in the six degrees of freedom of x, y, z, r, v, and w may all affect the imaging quality of the optical system (for example, affecting the size of the resolution). In other embodiments of the present application, the relative position adjustment manner may be to adjust only in any one of the above six degrees of freedom, or may be a combination of any two or more of them.

Further, in an embodiment, in the active alignment step, the adjustment of the relative position of the first lens component and the second lens component includes translation on the adjustment plane, namely, movement in x and y directions.

Further, in an embodiment, in the active alignment step, the adjustment of the relative position of the first lens component and the second lens component further includes: adjusting and determining an included angle between an axis of the first lens component and an axis of the second lens component according to the measured resolution of the optical system, namely, adjustment in w and v directions. In the assembled optical camera lens or camera module, there may be a non-zero included angle between the axis of the first lens component and the axis of the second lens component.

Further, in an embodiment, in the active alignment step, the adjustment of the relative position of the first lens component and the second lens component further includes: moving the first lens component in a direction perpendicular to the adjustment plane (i.e. adjustment in a z direction), and determining the relative position between the first lens component and the second lens component in a direction perpendicular to the adjustment plane according to the measured resolution of the optical system.

Further, in an embodiment, the first lens component may not have a first lens barrel. For example, the first lens component may be composed of a single first lens sheet. Before active alignment, pre-positioning is correspondingly performed so that there is a clearance between the bottom surface of the first lens sheet and the top surface of the second lens component. Thereafter, active alignment is performed, and then the glue material is arranged in the clearance and the glue material is cured. In this embodiment, the first lens sheet may be formed by a plurality of sub-lens sheets that are engaged or bonded to each other to form one body. In this embodiment, a side surface and a top surface of non-optical surfaces of the first lens sheet that are not used for imaging may form a light shielding layer. The light-shielding layer may be formed by screen printing a light-shielding material on the side surface and the top surface of the first lens sheet.

In an embodiment, in the active alignment step, the second lens component can be fixed, the first lens component can be clamped by a clamper, and the first lens component can be moved under the drive of a six-axis motion mechanism connected to the clamper, thereby realizing the above-mentioned relative movement of six degrees of freedom between the first lens component and the second lens component. The clamper can bear against or partially bear against the side surface of the first lens component, thereby clamping the first lens component and performing position adjustment with multiple degrees of freedom.

In the above embodiments, the actual imaging result of the optical system composed of multiple lens sheet groups can be obtained according to the image data output by the photosensitive chip. In the active alignment technology, a target board can be arranged on the object side, the photosensitive assembly is powered on (=is electrified), and the photosensitive assembly directly outputs image data for imaging the target board. Based on the image data, resolution data (such as MTF curve, SFR or TV line) of the calibrated/aligned optical system can be obtained, and then it is determined whether the image quality reaches a standard.

It needs to be noted that in the present application, the fitting side is not limited to fitting to or match with the border of the terminal device. For example, in some modified embodiments, the optical camera lens has a first side and a second side opposite to the first side; and the lens sheet set of the optical camera lens includes a plurality of lenses. Moreover, the plurality of lenses includes at least one free-form lens, and the at least one free-form lens is adapted to deflect incident light toward the second side, so that the imaging plane of the optical system composed of the plurality of lens sheets is offset toward the second side. The first side is not limited to fitting to or match with the border of the terminal device. In principle, this type of optical camera lens can be applied to any application scenes that need to effect avoidance of other parts or housings or other structures on a side.

The above description only involves the preferred implementations of the present application and the explanation of the applied technical principle. It should be understood by those skilled in the art that the scope of disclosure involved in the present application is not limited to the technical solutions formed by specific combinations of the above technical features, and at the same time, should also cover other technical solutions formed by any combination of the above technical features or equivalent features thereof without departing from the concept of the disclosure. For example, the above features and the technical features with similar functions disclosed in the present application (but not limited thereto) can be replaced with each other to form technical solutions.

The invention claimed is:

1. An optical camera lens, wherein the optical camera lens comprises:
    a lens barrel having an axis and a lens barrel side surface surrounding the axis, the lens barrel side surface comprising a first side and a second side opposite to the first side; and
    a lens sheet set mounted in the lens barrel and comprising a plurality of lenses, wherein the plurality of lenses comprise at least one free-form lens, and the at least one free-form lens is adapted to deflect incident light toward the second side, so that an imaging plane of an optical system composed of the plurality of lenses is offset toward the second side;
    wherein the optical camera lens has a mark for characterizing an offset direction of the imaging plane.

2. The optical camera lens according to claim 1, wherein the first side is a fitting side adapted to be disposed at a border of a terminal device, and the second side is an opposite side located at a position opposite to the fitting side; and the at least one free-form lens is located at a rear end of the other lenses of the lens sheet set.

3. The optical camera lens according to claim 2, wherein the lens barrel comprises a first lens barrel and a second lens barrel, the at least one free-form lens is mounted in the second lens barrel, the other lenses of the lens sheet set are mounted in the first lens barrel, and the first lens barrel and the second lens barrel are bonded by a first glue material.

4. The optical camera lens according to claim 3, wherein the first glue material is adapted to support and fix the first lens barrel and the second lens barrel after curing,
    so that a first lens sheet group and a second lens sheet group are maintained at a relative position determined when the first lens sheet group and the second lens sheet group are actively aligned,
    wherein the first lens sheet group is a lens sheet group composed of all lenses mounted in the first lens barrel, and the second lens sheet group is a lens sheet group composed of all lenses mounted in the second lens barrel.

5. The optical camera lens according to claim 1, wherein the free-form lens is axisymmetric, and a direction of a symmetry axis of the free-form lens is consistent with an offset direction of the imaging plane.

6. The optical camera lens according to claim 1, wherein an optical zone of the free-form lens comprises a first region close to the first side and a second region close to the second side, and a maximum thickness of the first region is less than a maximum thickness of the second region.

7. The optical camera lens according to claim 1, wherein an optical zone of the free-form lens comprises a first region close to the first side and a second region close to the second side, and an average curvature of the first region is less than an average curvature of the second region.

8. The optical camera lens according to claim 5, wherein the free-form lens comprises an object side surface and an image side surface; and light incident on the free-form lens is not deflected on the object-side surface but is deflected only on the image side surface, or the light incident on the free-form lens is deflected on both the object side surface and the image side surface.

9. The optical camera lens according to claim 1, wherein the at least one free-form lens tilts an optical axis of the optical camera lens toward a direction of the deflection.

10. A camera module, wherein the camera module comprises:
   the optical camera lens according to claim 1; and
   a photosensitive assembly, wherein the optical camera lens is mounted on the photosensitive assembly.

11. The camera module according to claim 10, wherein the photosensitive assembly comprises a photosensitive chip, and a center of a photosensitive region of the photosensitive chip coincides with a center of the imaging plane offset toward the second side.

12. The camera module according to claim 10, wherein the photosensitive assembly comprises a photosensitive chip, and a central axis of a photosensitive region of the photosensitive chip is closer to the second side than a central axis of the lens barrel.

13. The camera module according to claim 10, wherein an outer side surface of the photosensitive assembly has a fitting side adapted to be disposed at a border of a terminal device, the fitting side of the outer side surface has a retracted surface retracted from outside to inside, and one end of the retracted surface is located on a bottom surface of the photosensitive assembly.

14. The camera module according to claim 10, wherein the photosensitive assembly comprises:
   a circuit board;
   a photosensitive chip mounted on the circuit board;
   a lens holder mounted on a surface of the circuit board and surrounding the photosensitive chip; and
   a color filter mounted on the lens holder;
   wherein a top surface of the lens holder and the optical camera lens are bonded by a second glue material.

15. The camera module according to claim 13, wherein the optical camera lens and the photosensitive assembly are bonded by a second glue material, and the fitting side of the photosensitive assembly and the first side of the optical camera lens are arranged on the same side; and the second glue material is adapted to support and fix the optical camera lens and the photosensitive assembly after curing, so that a relative position of the optical camera lens and the photosensitive assembly is maintained at a relative position determined by active alignment.

16. A camera module, wherein the camera module comprises:
   the optical camera lens according to claim 4; and
   a photosensitive assembly, wherein the optical camera lens is mounted on the photosensitive assembly,
   wherein a top surface of the second lens barrel or a top surface of the second lens sheet group has the mark for characterizing an offset direction of the imaging plane.

17. A terminal device, wherein the terminal device comprises:
   a housing with a border; and
   the camera module according to claim 10, wherein a fitting side of the optical camera lens and a fitting side of the photosensitive assembly are both disposed at adapting positions of the border, an inner side surface of the border has a recessed portion recessed toward an outer side surface of the border, and the recessed portion accommodates the fitting side of the optical camera lens.

18. An assembling method for optical camera lens, wherein the method comprises:
   pre-positioning a first lens component and a second lens component so that a first lens sheet group and a second lens sheet group constitute an imageable optical system, wherein the first lens component comprises the first lens sheet group, the second lens component comprises the second lens sheet group, the second lens sheet group comprises at least one free-form lens, and the second lens component has a first side and a second side opposite to the first side, and
   wherein the at least one free-form lens is adapted to deflect incident light toward the second side, so that an imaging plane of the optical system is offset toward the second side;
   performing active alignment on the first lens component and the second lens component, wherein
   the active alignment is to adjust a relative position of the first lens component and the second lens component based on an actual imaging result of the optical system; and
   bonding the first lens component and the second lens component, so that the relative position of the two is maintained at a relative position determined by active alignment.

19. An assembling method for camera module, wherein the method comprises:
   pre-positioning a first lens component, a second lens component and a photosensitive assembly so that a first lens sheet group and a second lens sheet group constitute an imageable optical system, and a photosensitive chip can receive an image formed by the optical system, wherein
   the first lens component comprises the first lens sheet group, the second lens component comprises the second lens sheet group, the second lens sheet group comprises at least one free-form lens, the second lens component has a first side and a second side opposite to the first side,
   and the photosensitive assembly comprises the photosensitive chip, and wherein the at least one free-form lens is adapted to deflect incident light toward the second side, so that an imaging plane of the optical system is offset toward the second side;
   performing active alignment on the first lens component, the second lens component and the photosensitive assembly, wherein the active alignment is to adjust a relative position of the first lens component and the second lens component, and a relative position of the second lens component and the photosensitive assembly based on an actual imaging result of the optical system; and
   bonding the first lens component and the second lens component, and bonding the second lens component and the photosensitive assembly, so that the relative positions of the first lens component, the second lens component, and the photosensitive assembly are all maintained at relative positions determined by active alignment.

* * * * *